US010777883B2

(12) United States Patent
Coleman et al.

(10) Patent No.: US 10,777,883 B2
(45) Date of Patent: Sep. 15, 2020

(54) PHASE-CONJUGATE ANTENNA SYSTEM

(71) Applicant: Envisioneering, Inc., Alexandria, VA (US)

(72) Inventors: Jeffrey Owen Coleman, Kensington, MD (US); Mark Dorsey, Elkridge, MD (US); Mark Parent, Port Tobacco, MD (US); Gary Hoover, Chantilly, VA (US); Phil Girardi, Reston, VA (US)

(73) Assignee: Envisioneering, Inc., Alexandria, VA (US)

( * ) Notice: Subject to any disclaimer, the term of this patent is extended or adjusted under 35 U.S.C. 154(b) by 325 days.

(21) Appl. No.: 15/791,820

(22) Filed: Oct. 24, 2017

(65) Prior Publication Data

US 2019/0067809 A1 Feb. 28, 2019

Related U.S. Application Data

(63) Continuation-in-part of application No. 13/570,603, filed on Aug. 9, 2012, now Pat. No. 9,806,430.
(Continued)

(51) Int. Cl.
*H01Q 21/06* (2006.01)
*H01Q 1/52* (2006.01)
(Continued)

(52) U.S. Cl.
CPC ........... *H01Q 1/525* (2013.01); *H01Q 21/064* (2013.01); *H01Q 21/205* (2013.01); *G01S 7/021* (2013.01);
(Continued)

(58) Field of Classification Search
CPC .... H01Q 21/064; H01Q 21/205; H01Q 21/22; H01Q 21/08; H01Q 21/00; H01Q 1/525; H01Q 3/2647; H01Q 13/02; H01Q 12/208
(Continued)

(56) References Cited

U.S. PATENT DOCUMENTS

| 3,594,802 A * | 7/1971 | Koob .................... H01Q 21/20 343/705 |
| 3,789,417 A * | 1/1974 | Coleman ................. H01Q 3/40 343/816 |
| 3,803,618 A | 4/1974 | Coleman |
| 4,612,543 A | 9/1986 | DeVries |
| 4,792,808 A * | 12/1988 | Hildebrand .......... H01Q 21/205 343/754 |
| 4,980,692 A | 12/1990 | Rudish et al. |

(Continued)

OTHER PUBLICATIONS

Larsen, Tove; "Laboratory of Electromagnetic Theory: A Theoretical Investigation of Van Atta Arrays," The Technical University of Denmark, Scientific Report No. 1, S127 R39, Contract No. AF 61(052)-794, Nov. 1964, 39pgs.

*Primary Examiner* — Chuong P Nguyen
(74) *Attorney, Agent, or Firm* — Duane Morris LLP

(57) ABSTRACT

Various embodiments of the present disclosure provide an antenna system including a first set of receive antenna elements and a second set of transmit antenna elements. Each receive antenna element is paired with one of the transmit elements. Paired receive and transmit antenna elements point in the same azimuthal direction, and the receive antenna element feeds its paired transmit antenna element. Each receive antenna element and each transmit antenna element has a phase center, and the phase centers of the receive and transmit antenna elements are all positioned substantially along the same axis. The receive and transmit elements are arranged in a phase-conjugate configuration such that, for each pair of receive and transmit antenna elements, those receive and transmit antenna elements are altitudinally spaced substantially the same distance from a plane through the antenna system.

20 Claims, 10 Drawing Sheets

Related U.S. Application Data

(60) Provisional application No. 61/521,577, filed on Aug. 9, 2011.

(51) Int. Cl.
*H01Q 21/20* (2006.01)
*H01Q 21/22* (2006.01)
*G01S 7/02* (2006.01)
*H04K 3/00* (2006.01)
*G01S 7/38* (2006.01)
*H01Q 13/02* (2006.01)

(52) U.S. Cl.
CPC .............. *G01S 7/38* (2013.01); *H01Q 13/02* (2013.01); *H01Q 21/22* (2013.01); *H04K 3/43* (2013.01)

(58) Field of Classification Search
USPC .............................. 342/385, 350, 359, 361
See application file for complete search history.

(56) References Cited

U.S. PATENT DOCUMENTS

| | | | |
|---|---|---|---|
| 6,900,775 B2 | 5/2005 | Shapira | |
| 6,922,177 B2* | 7/2005 | Barnes | G01S 13/0209 343/844 |
| 7,113,748 B2* | 9/2006 | Shapira | H01Q 1/246 342/361 |
| 7,327,812 B2 | 2/2008 | Auer | |
| 7,663,546 B1 | 2/2010 | Miyamoto et al. | |
| 8,344,943 B2* | 1/2013 | Brown | G01S 7/03 342/147 |
| 8,842,040 B1* | 9/2014 | Dorsey | H01Q 3/267 342/174 |
| 10,164,346 B2* | 12/2018 | Ming | H01Q 1/246 |
| 10,256,552 B2* | 4/2019 | Jan | H01Q 1/246 |
| 2003/0043067 A1 | 3/2003 | Johansson et al. | |
| 2005/0195103 A1 | 9/2005 | Davis et al. | |
| 2010/0066590 A1* | 3/2010 | Brown | G01S 7/03 342/147 |
| 2011/0299625 A1 | 12/2011 | Hooli et al. | |
| 2014/0159954 A1 | 6/2014 | Stoddard | |
| 2018/0375218 A1* | 12/2018 | Kamo | H01Q 21/064 |

* cited by examiner

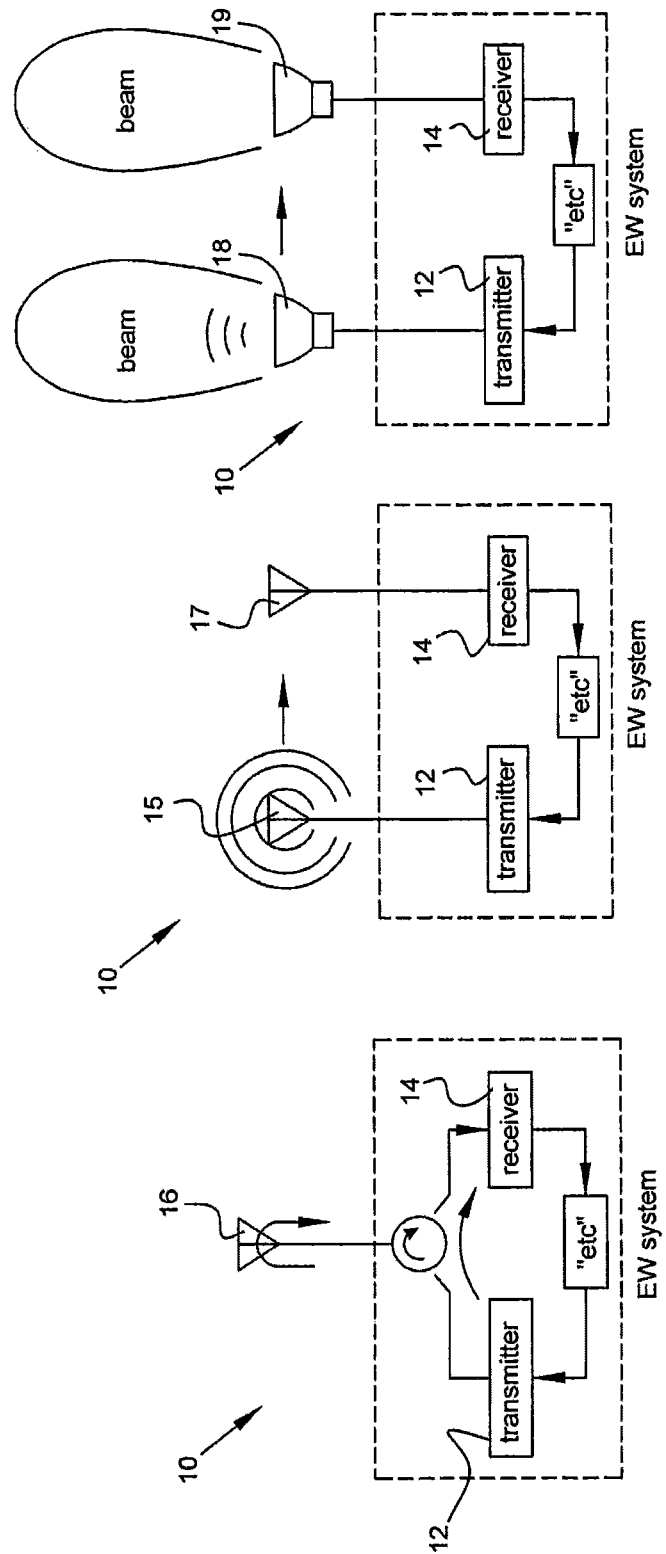

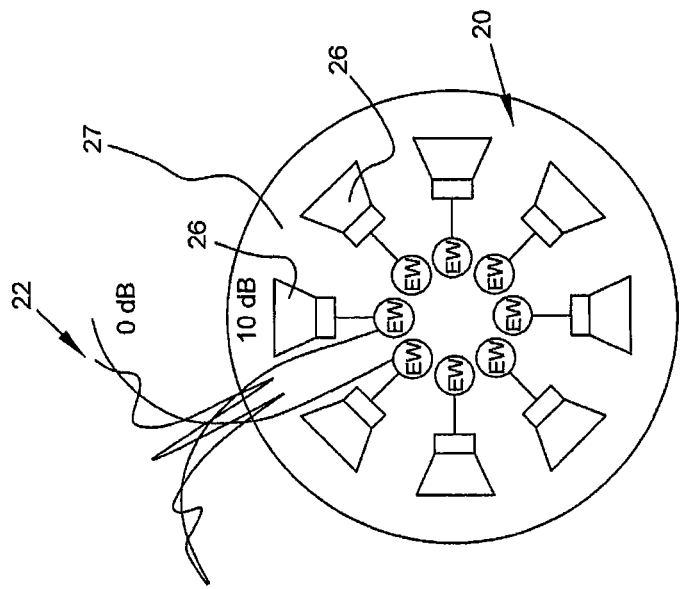
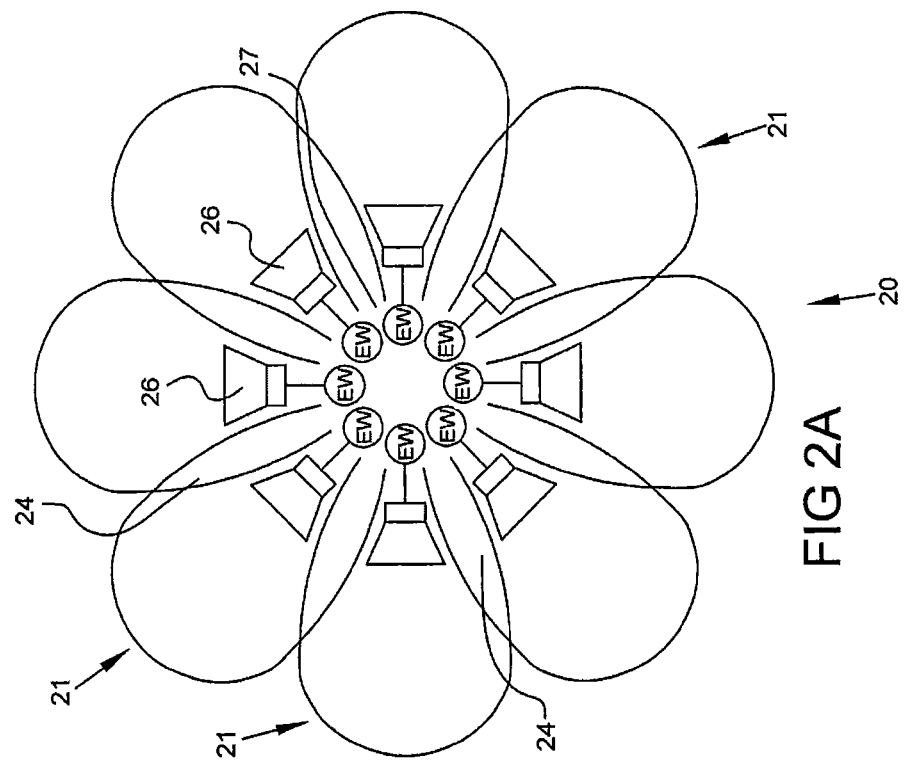

PHASE-CONJUGATE ANTENNA SYSTEM

PRIORITY CLAIM

This application is a continuation-in-part of, and claims priority to and the benefit of, U.S. patent application Ser. No. 13/570,603, which was filed on 9 Aug. 2012, which claims priority to and the benefit of U.S. Provisional Patent Application No. 61/521,577, which was filed on 9 Aug. 2011, the entire contents of each of which are incorporated herein by reference.

GOVERNMENT LICENSE RIGHTS

The U.S. Government has a paid-up license in this invention and the right in limited circumstances to require the patent owner to license others on reasonable terms as provided for by the terms of contract number N00173-10-C-2010 awarded by the U.S. Navy, Naval Research Laboratory.

BACKGROUND

The present disclosure is generally directed towards antenna systems and subsystems for an electronic warfare (EW) repeater. EW countermeasure systems often rely upon re-radiation of incident energy coming from enemy or threat detection, guidance, and tracking systems to limit their respective effectiveness. Thus, adequate protection may require omnidirectional coverage in azimuth to address threats present from any incidence angle.

Prior art EW countermeasure systems include mechanically pointed antenna systems, phased array antenna systems, and systems including multiple distributed apertures; however, these conventional systems provide several shortcomings. For example, mechanically pointed antenna systems generally handle only one threat axis at a time. Phased array antenna systems must generally be switched on a pulse-by-pulse basis as these repeater antenna systems commonly consist of phased array antennas with switched, directive beams. To provide an omnidirectional azimuth coverage with this type of antenna system, multiple phased arrays are used, and each phased array covers a sector of the azimuth plane. Each phased array must then switch high gain beams throughout the respective scan planes to provide full coverage. For such a conventional system to handle multiple threats, the phased array antenna must be capable of generating multiple beams simultaneously.

While the aforementioned systems are useful in certain situations, there is a need in the art to provide a high-gain, dual-polarized repeater that enhances the performance of the associated EW system aimed at deceiving enemy detection, guidance, and tracking systems.

There is also a need in the art to provide advantages over phased array systems, systems utilizing mechanically pointed antenna systems, and/or systems including multiple distributed apertures by reducing the number of antenna elements and hence the complexity and cost of the system, eliminate beam scanning, eliminate beam switching, provide multiple threat jamming capabilities, provide antenna design flexibility, eliminate the need for direction finding, and provide a coverage area free of grating lobes thereby mitigating the potential for blind spots in coverage.

SUMMARY

In view of these needs, one embodiment of the present subject matter provides an antenna system having a first set of antenna elements for receiving first signals and a second set of antenna elements for transmitting second signals. The antenna system also includes an electronics module which connects the first receiving element with the first transmitting element. In this embodiment, a first one of the receiving elements and a first one of the transmitting elements are disposed so as to point in the same direction, and the first transmitting element and a second transmitting element may be disposed such that the beams from the first and second transmitting elements overlap.

Another embodiment of the present subject matter provides an antenna system having a receive assembly with a first set of antenna elements for receiving first signals, each antenna element in said the set being disposed from a respective adjacent antenna element by a predetermined azimuthal increment and by a predetermined altitudinal increment. The antenna system also includes a transmit assembly having a second set of antenna elements for transmitting second signals, each antenna element in the second set being disposed from a respective adjacent antenna element by a predetermined azimuthal increment and by a predetermined altitudinal increment. The antenna system further includes an electronics assembly operatively connecting the receive assembly with the transmit assembly. In this embodiment, the predetermined azimuthal increment of the first set is substantially similar to the predetermined azimuthal increment of the second set, and the predetermined altitudinal increment of the first set is substantially similar to the predetermined altitudinal increment of the second set.

A further embodiment of the present subject matter provides a phase-conjugate antenna system having a first set of antenna elements for receiving first signals and a second set of antenna elements for transmitting second signals. The disposition of the first and second sets of antenna elements are mirror images about a predetermined plane through the antenna system. Further, a first one of the second set of elements is fed by a first one of the first set of antenna elements based in part by the disposition of the first and second sets of antenna elements.

An additional embodiment of the present subject matter provides an antenna system having a first set of antenna elements for receiving first signals, each antenna element in the first set being disposed from a respective adjacent antenna element by a predetermined vertical increment and by a predetermined lateral increment. The antenna system further includes a second set of antenna elements for transmitting second signals, each antenna element in the second set being disposed from a respective adjacent antenna element by a predetermined vertical increment and by a predetermined lateral increment. The predetermined vertical and lateral increments of the first set are substantially similar to the predetermined vertical and lateral increments of the second set, and the predetermined vertical and lateral increments of the first set may be based in part on antenna gain or frequency range.

These and other embodiments of the present subject matter will be readily apparent to one skilled in the art to which the disclosure pertains from a perusal or the claims, the appended drawings, and the following detailed description.

BRIEF DESCRIPTION OF THE DRAWINGS

FIG. 1A is an illustration of an electronic warfare system employing a single antenna.

FIG. 1B is an illustration of an electronic warfare system employing separate omnidirectional antennas.

FIG. 1C is an illustration of an electronic warfare system employing separate directional antennas.

FIG. 2A is an illustration of an electronic warfare repeater system using directional antennas for sector coverage.

FIG. 2B is an illustration of an interference pattern for the electronic warfare repeater system of FIG. 2A.

DETAILED DESCRIPTION

Figure 3:
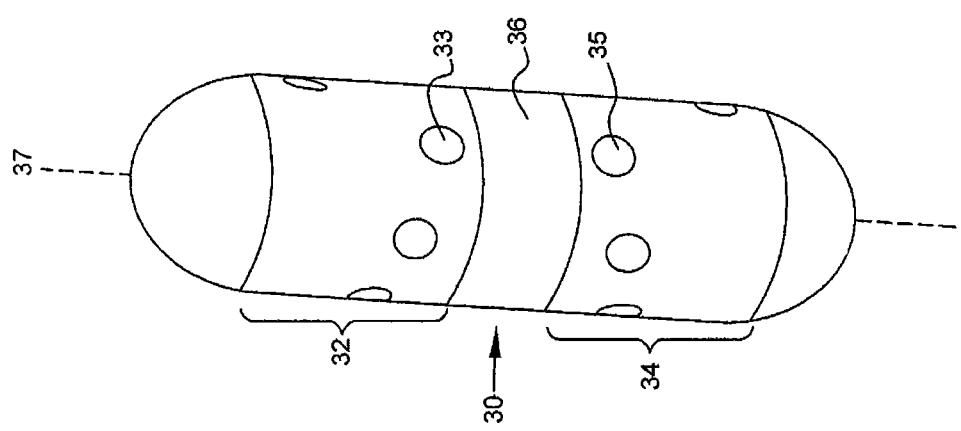
FIG. 3 is a pictorial representation of one embodiment of the present subject matter.

With reference to the figures where like elements have been given like numerical designations to facilitate an understanding of the present subject matter, the various embodiments of a method and system for phase-conjugate configuration of high-gain, dual-polarized sector antennas for a repeater are described.

Embodiments of the present subject matter may provide a high-gain, dual-polarized, omnidirectional repeater enhancing the performance of an associated antenna system including, but not limited to, an electronic warfare (EW) system aimed at deceiving enemy detection, guidance, and tracking systems. Exemplary antenna configurations according to embodiments disclosed herein may fundamentally change military EW tracking and guidance systems.

It should be noted that while the following description is generally directed to an antenna system employed in a repeater system to facilitate EW countermeasures on an appropriate platform, the claims appended herewith should not be so limited as embodiments of the present subject matter may find utility in a myriad of industries and technologies including as a radio beacon for airport authorities, cellular networks and the like; as radio frequency jamming systems; as well as other uses, military or civilian, where a need may exist for a beaconing response free of grating lobes. Antenna designs and configurations according to embodiments of the present subject matter may provide omnidirectional coverage necessary for adequate EW protection while also providing high transmit-to-receive isolation allowing for adequate electronic system gain. For example, one embodiment may include a configuration of receive and transmit antenna elements that achieves phase conjugation and may offer benefits over conventional technologies by facilitating design and implementation of a, for example, self-contained distributed jammer with a retro-directive antenna response that reduces dependence on external EW systems to thereby increase the effectiveness of the system and survive a threat engagement. Furthermore, embodiments of the present subject matter may provide a high-gain, dual-polarized, broadband, omnidirectional coverage without the need for expensive and complex phased-array transmit antennas or mechanically pointed antenna systems, both of which require the direction of arrival of an incoming radio frequency (RF) signal.

In repeater jammer systems, the ability to simultaneously receive and transmit may be advantageous. FIG. 1A is an illustration of an EW system employing a single antenna. With reference to FIG. 1A, an EW repeater 10 using ideal components may include one aperture 16 for transmitting signals from a transmitter 12 and for receiving signals for a receiver 14. Such a configuration, however, may result in the creation of undesired oscillations. FIG. 1B is an illustration of an EW system employing separate omnidirectional antennas. With reference to FIG. 1B, an EW repeater 10 using a separate omnidirectional transmit antenna 15 and a separate omnidirectional receive antenna 17 is illustrated. These separate apertures 15, 17 may be used for transmitting and receiving to achieve isolation and avoid self-oscillations resulting from recirculation of amplified noise. If, however, omnidirectional coverage is required, achieving the required isolation may be difficult as the transmit antenna 15 radiates energy in all directions, including the direction of the receive antenna 17. FIG. 1C is an illustration of an EW system employing separate directional antennas. With reference to FIG. 1C, to improve isolation of the transmitter 12 and receiver 14 in the EW repeater 10, respective receive and transmit directional antennas 19, 18 may be used to minimize radiation from the transmit antenna 18 in the direction of the receive antenna 19.

To use separate directional antennas in an exemplary EW system requiring omnidirectional coverage, directional antenna pairs (e.g., a receive antenna paired with a transmit antenna pointing in the same direction) are responsible for covering a sector.

FIG. 2A is an illustration of an EW repeater system using directional antennas for sector coverage, and FIG. 2B is an illustration of one interference pattern for the EW repeater system of FIG. 2A. With reference to FIGS. 2A and 2B, an EW repeater system 20 is illustrated having N=8 directional antennas 26 providing omnidirectional sector coverage 21. In an ideal EW repeater system, the sectors 21 would be independent to avoid generation of an interference pattern. No antenna exists, however, that is capable of satisfying this requirement which leads to the typical pattern overlap 24 between the antenna pattern of adjacent sectors 21. Furthermore, use of high gain, directional antennas 26 may introduce a large spacing 27 between antennas 26 thereby leading to severely uneven gain (e.g., grating lobes) 22 in the radar cross-section (RCS) generated by the EW repeater system 20. In this example, these grating lobes 22 may be generated when the antennas 26 are located along an arc of radius 12λ. Such a grating lobe pattern 22 may provide large fluctuations in the RCS resulting in potential vulnerabilities to the associated EW repeater system 20.

Antenna systems according to embodiments of the present subject matter may represent a subsystem of an EW jammer, for example. An exemplary antenna system may include a first antenna enclosure, module or assembly that houses one or more receive antennas and a second antenna enclosure, module or assembly that houses one or more transmit antennas. The terms enclosure, module and assembly are used interchangeably herein and such use should not limit the scope of the claims appended herewith. FIG. 3 is a pictorial representation of one embodiment of the present subject matter. With reference to FIG. 3, one embodiment of a high-gain, dual-polarized repeater system 30 may include a receive assembly or enclosure 34 having a first set of antenna elements 35 for receiving first signals. Each antenna element 35 in the first set may be disposed from a respective adjacent antenna element 35 by a predetermined azimuthal increment and by a predetermined altitudinal increment. The repeater system 30 may also include a transmit assembly or enclosure 32 having a second set of antenna elements 33 for transmitting second signals. Each antenna element 33 in the second set may be disposed from a respective adjacent antenna element 33 by a predetermined azimuthal increment and by a predetermined altitudinal increment. In this embodiment, an electronics assembly or enclosure 36 may be provided that operatively connects the receive assembly 34 with the transmit assembly 32.

Figure 4:
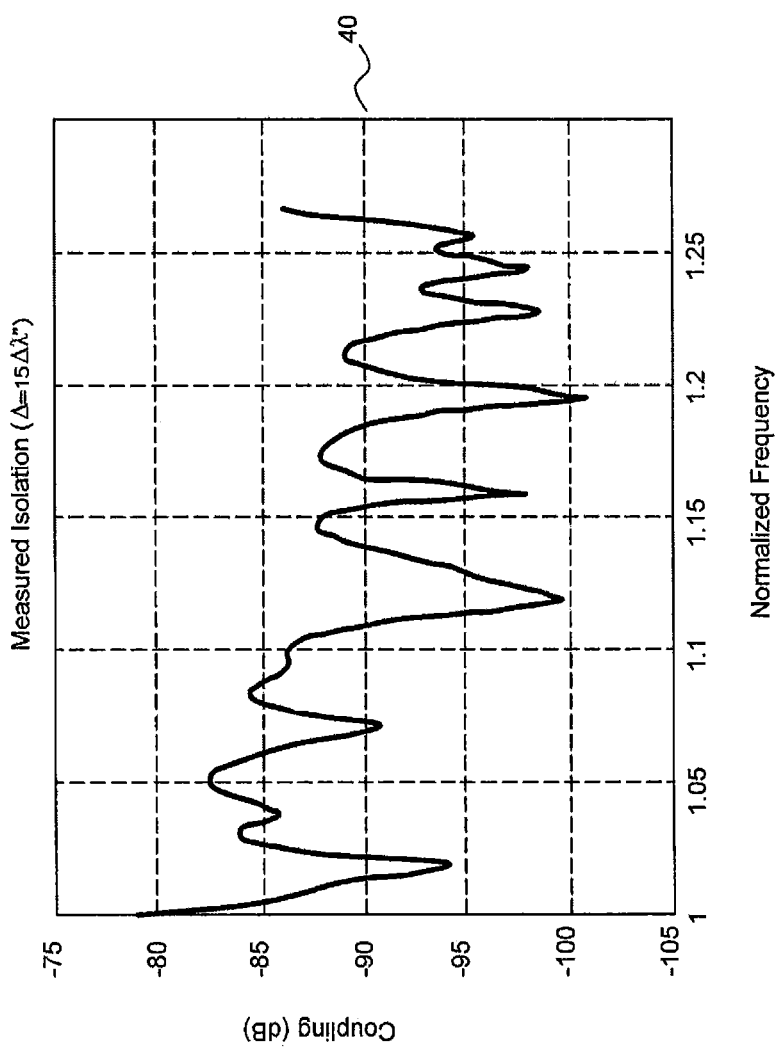
FIG. 4 is a graphical illustration of measured isolation as a function of normalized frequency for two corrugated horn antennas separated by a distance of 15λ.

In the illustrated embodiment, each assembly 32, 34 houses eight antenna elements 33, 35; however, embodiments of the present subject matter should not be so limited as it is envisioned that antenna systems described herein may include any number of antenna elements (e.g., more or less than sixteen—eight per enclosure). It is also contemplated that additional embodiments may employ a plurality of such assemblies in a 'stacked' system whereby respective receive/transmit assemblies in the stacked system operate at different frequency ranges, possess differing bandwidths, etc. Each antenna 33, 35 in the exemplary antenna system 30 may cover a specified sector as illustrated in FIG. 2A, but the system 30 may also provide a configuration allowing the use of high gain antennas without the generation of grating lobes. Exemplary antenna elements may be, but are not limited to, horn antennas (e.g., corrugated horn antennas) as these horn antennas provide ultra-low, wide-angle side lobe levels (SLLs). Exemplary corrugated horn antennas may facilitate transmit/receive isolation exceeding 110 dB with closely-spaced EW transmitters and receivers without the need for active cancelling and/or absorption. FIG. 4 is a graphical illustration of measured isolation as a function of normalized frequency for two corrugated horn antennas separated by a distance of 15λ. With reference to FIG. 4, ultra-low radiation at wide angles for exemplary horn antennas may result in high isolation for moderate aperture separations and may thus eliminate the need for shielding receive and/or transmit assemblies or enclosures 34, 32 to achieve desired isolation levels. As illustrated in FIG. 4, a mean isolation 40 of 90 dB is exhibited for a separation distance of 15λ for two corrugated horn antennas. Greater isolation may be achieved by optimizing antenna design to further minimize unwanted radiation in wide-angle SLL. While corrugated horn antennas may enhance system performance owing to their high gain, dual-polarization performance, and low wide-angle SLL, other antenna elements may be employed in embodiments of the present subject matter and the embodiments described herein using horn antennas should not limit the scope of the claims appended herewith.

With continued reference to FIG. 3, the receive and transmit assemblies 34, 32 and respective antenna elements 35, 33 are arranged in a phase-conjugate configuration. The electronics assembly 36 may house or include any necessary electronics for generating appropriate EW waveforms. While FIG. 3 illustrates each assembly 32, 34, 36 as co-located, embodiments of the present subject matter and the claims appended herewith should not be so limited as it may become beneficial to separate the receive and transmit assemblies 34, 32 to enhance isolation and/or simplify integration onto a given platform. In the embodiment of FIG. 3, the pointing angles of the antenna apertures 35, 33 are rotated at 45-degree angular increments about the vertical axis 37 of the system 30. In the illustrated embodiment, beamwidth of the antennas may be, but is not limited to, 45 degrees, and the angular separation between antenna pointing directions may be selected to ensure overlap at the 3 dB points of the antenna patterns to thereby minimize ripple in the coverage of the repeater system 30. Of course, for higher gain systems, antennas with narrower beamwidths may be employed whereby more antennas would be used to maintain overlap at the respective antenna's 3 dB points to thereby minimize ripple in the azimuth plane of the antenna pattern. For example, in an embodiment of the present subject matter having a beamwidth of 22.5 degrees, to achieve an omnidirectional system and overlap at the 3 dB of the antenna patterns, sixteen antenna elements may be employed for each of the respective receive and transmit assemblies. Thus, any depiction of eight apertures in each receive and transmit assembly should not limit the scope of the claims appended herewith. Further, embodiments of the present subject matter may not necessarily require omnidirectional coverage as shown in FIG. 3 and described herein but may rather provide a linear, semi-circular, arcuate or other coverage depending upon the respective use of such embodiment. Additionally, the amount of signal leaking from the transmit to receive apertures may be minimized by decreasing the coupling through a reduction in the amount of edge current leaking at the respective apertures.

The radius of an exemplary enclosure 32, 34 is selected such that the phase centers of the corrugated horns (which are not necessarily at the aperture of the antenna) lie as close as possible to the vertical axis 27 of the enclosures 32, 34. The phase centers lie directly above each other to minimize ripple in the azimuthal plane. The phase centers are as close to the vertical axis of the enclosure as possible subject to acceptable mechanical tolerances. As illustrated, the receive assembly or enclosure 34 contains eight antennas 35 pointing in the same eight directions as the eight antennas 33 in the transmit assembly or enclosure 32. The vertical locations of the antennas 35 in the receive enclosure 34 are the mirror images of the vertical locations of the antennas 33 in the transmit enclosure 32 to achieve phase conjugation. For example, the predetermined azimuthal increment of the transmit set of antennas is substantially similar to the predetermined azimuthal increment of the receive set of antennas, and the predetermined altitudinal increment of the transmit set of antennas is substantially similar to the predetermined altitudinal increment of the receive set of antennas. In one embodiment, the predetermined azimuthal increment of the sets of antennas may be, but is not limited to, 22.5 degrees, 45 degrees, 60 degrees, and 90 degrees. Additionally, the predetermined altitudinal or elevational increment of the sets of antennas may generally be based upon the mechanical tolerances of the respective antennas and/or size of the apertures. Thus, for embodiments finding utility in lower frequency settings, the antenna elements may be larger and the respective pitch of the helix or vertical increment between adjacent elements larger. For embodiments finding utility in higher frequency settings, it follows that the antenna elements may be smaller and the respective pitch of the helix or vertical increment between adjacent elements smaller. As discussed above, respective and corresponding receive/transmit antennas are disposed so as to point in the same direction. This arrangement may be helical about an axis, semi-circular about an axis, arcuate about an axis, or may be linear and may be optimized as appropriate per mechanical limitations and/or tolerances. This arrangement of the receive/transmit antennas would be mirror images about a predetermined plane through the respective antenna system.

Another embodiment of the present subject matter may provide an antenna system having a first set of antenna elements for receiving first signals, a second set of antenna elements for transmitting second signals, and an electronics module which connects the first receiving element with the first transmitting element. In this embodiment, a first one of the receiving elements and a first one of the transmitting elements are disposed so as to point in the same direction, and the first transmitting element and a second transmitting element may be disposed such that the beams from these first and second transmitting elements overlap. These beams may overlap at approximately the 3 dB points. These antenna elements may be, but are not limited to, horn antennas (e.g., corrugated horn antennas), directional antenna elements, or other elements. In one embodiment, an input signal to the first transmitting element is based in part on an output signal of the first receiving element. Thus in this embodiment, ripple in the elevational and/or azimuthal planes may be mitigated through the use of the output of a given receive antenna as the input to a single channel of the EW electronics and the output of the EW electronics as the input to a transmit antenna pointing in the same direction as the given receive antenna. In another embodiment, a phase center of the first transmitting element and a phase center of the second transmitting element each lie on a predetermined axis. It should be noted that the disposition of the transmitting and receiving elements are mirror images about a predetermined plane through the antenna system. The first and second sets of elements may be positioned on a cylinder and may be disposed around the cylinder so as to transmit omnidirectionally in azimuth. Of course, these elements may be disposed in a number of geometric patterns and such an example should not limit the scope of the claims appended herewith. Thus, by mirroring the vertical distribution of the apertures in the receive enclosure with respect to those in the transmit enclosure, large element spacing inherent in arrays of high gain antennas may be used without generating grating lobes, and the response of a given antenna in the receive enclosure may serve as the complex excitation for its paired antenna in the transmit enclosure.

An additional embodiment of the present subject matter provides a phase-conjugate antenna system having a first set of antenna elements for receiving first signals and a second set of antenna elements for transmitting second signals. The dispositions of the first and second sets of antenna elements are mirror images about a predetermined plane through the antenna system, and a first one of the second set of elements is fed by a first one of the first set of antenna elements based in part on the disposition of the first and second sets of antenna elements. Exemplary antenna elements may be horn antennas, directional antenna elements, or other antenna elements. The system may also include an electronics assembly operatively connecting the first and second sets of antenna elements. In one non-limiting embodiment, the second set of antenna elements may be disposed around a central axis so as to transmit omnidirectionally in azimuth.

A further embodiment of the present subject matter may include a first set of antenna elements for receiving first signals and a second set of antenna elements for transmitting second signals. In this embodiment, each antenna element in the first and second sets may be disposed from a respective adjacent antenna element in that set by a predetermined vertical increment and by a predetermined lateral increment. The predetermined vertical and lateral increments of the first set are substantially similar to the predetermined vertical and lateral increments of the second set. Further, the predetermined vertical and lateral increments of the first set may be based in part on antenna gain or frequency range. In one embodiment, an input signal to a first one of the second set of antenna elements is based in part on an output signal of a first one of the first set of antenna elements. In another embodiment, a first one of the second set of antenna elements and a first one of the first set of antenna elements are disposed so as to point in the same direction. Additionally, a first one of the second set of antenna elements and a second one of the second set of antenna elements may be disposed such that the beams from these two elements overlap (e.g., at approximately the 3 dB points). Of course, in one embodiment, the dispositions of the first and second sets of antenna elements are mirror images about a predetermined plane through the antenna system.

Figure 5:
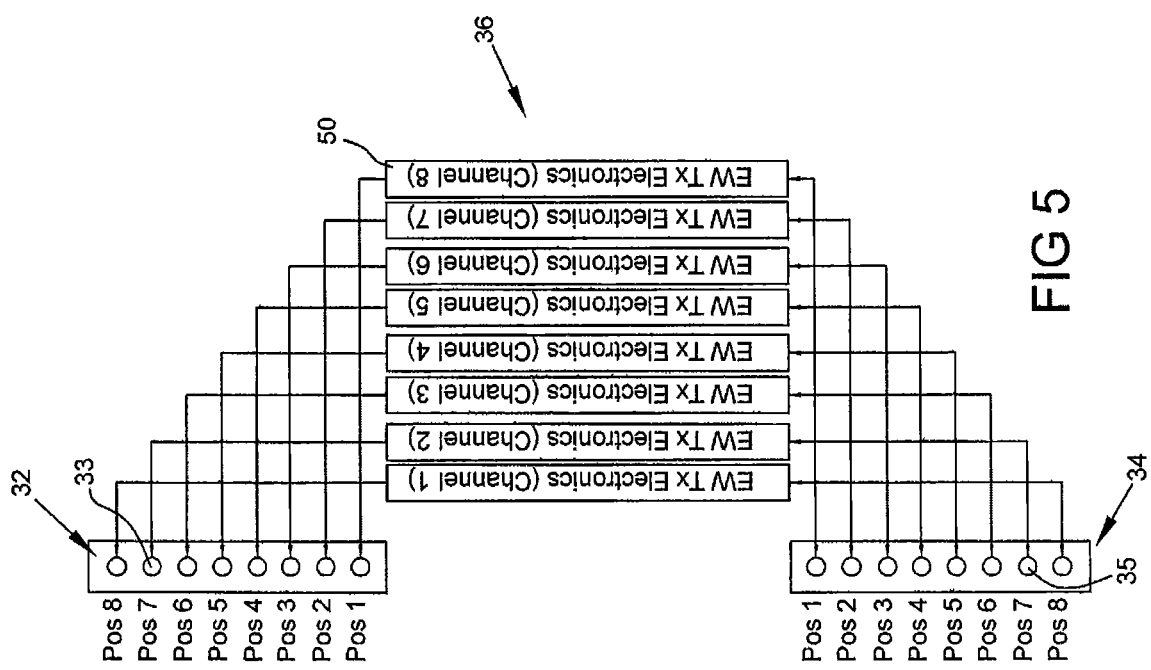
FIG. 5 is a simplified block diagram of electronic components for one embodiment of the present subject matter.

FIG. 5 is a simplified block diagram of electronic components for one embodiment of the present subject matter. With reference to FIGS. 3 and 5, an exemplary electronics assembly 36 may include electronic components 50 necessary to ensure the output of a given receive antenna 35 serves as the input to a single, respective channel of the EW electronics 50. The output of the EW electronics 50 may then serve as the input to a transmit antenna 33 pointing in the same direction as the given receive antenna 35. Thus, for embodiments of the present subject matter providing an exemplary phase-conjugate configuration, delay between respective channels should be matched. While not shown, each channel may include transmission lines, amplifiers, filters, and other active or passive components, hardware, and/or software needed for executing desired EW techniques; however, it should be noted that the disclosed concept is generally tolerant of amplitude and phase imbalance between the channels. Thus, an antenna system 30 according to embodiments of the present subject matter may enable continuous omnidirectional operation of an EW repeater system to multiple threats thereby providing an advantage over prior art systems that employ electronically switched or mechanically scanned beams. When all apertures or antennas are active simultaneously, a signal transmitted by a threat located at a given incidence angle may be received by multiple antennas or apertures 35 within the receive enclosure 34. These received signals then pass through their respective EW channels 50 and are transmitted by the corresponding antennas 33 within the transmit enclosure 32. The multiple transmitted signals may then be superimposed coherently on the threat's receiving antenna.

Figure 6:
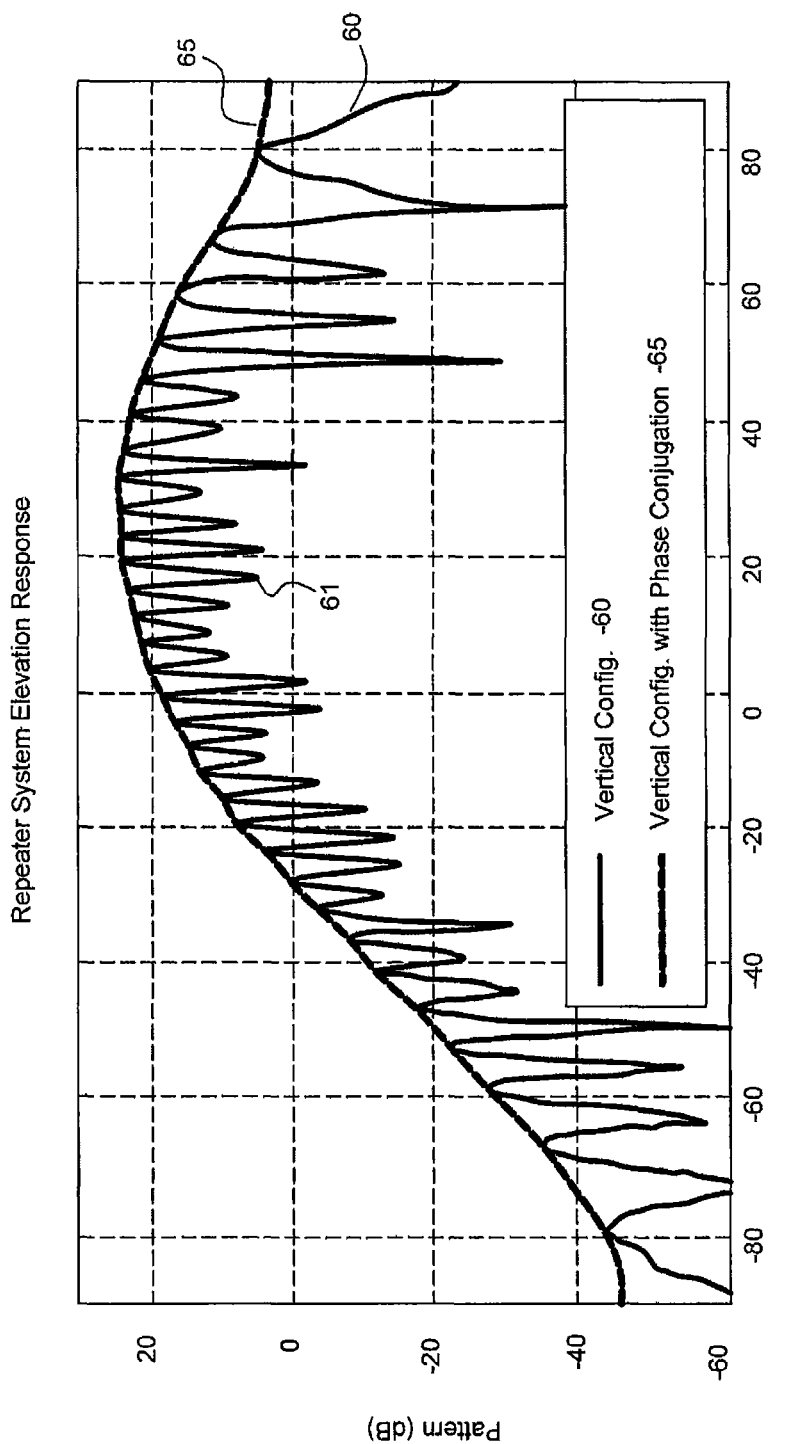
FIG. 6 is a graphical illustration of elevation patterns of two exemplary antenna systems.

As mentioned above, each assembly 32, 34 has phase centers of the respective antenna elements 33, 35 as close as possible to the vertical axis 37 of the enclosure to minimize ripple in the azimuthal plane of the repeater RCS. Ripple in the altitudinal or elevational plane of the RCS may be mitigated with an appropriate phase-conjugate configuration according to embodiments of the present subject matter. Thus, by mirroring the vertical distribution of the antennas or apertures 35 in the receive enclosure 34 with respect to the antennas or apertures 33 in the transmit enclosure 32, large element spacing inherent in arrays of high gain antennas may be used without generating grating-lobes. FIG. 6 is a graphical illustration of elevation patterns of two exemplary antenna systems. With reference to FIG. 6, a first exemplary EW system 60 may include eight corrugated horn antennas disposed such that the phase centers of the respective antennas are not all disposed along the vertical axis of the system. The illustrated EW system 60 therefore employs a vertical configuration without phase-conjugation. A second exemplary EW system 65 also includes eight corrugated horn antennas with phase centers of the respective antennas disposed along the vertical axis of the system with a 7.6 cm separation and antenna pointing angles spaced at 45° increments. Of course, any number of beams (and respective lateral or vertical separations) are contemplated by embodiments of the present subject matter (e.g., 60 degree, 90 degree beams, etc.) and such a disclosure is exemplary only. This EW system 65 uses a vertical configuration with phase-conjugation. As illustrated in FIG. 6, the phase-conjugation of the second system 65 eliminates the grating-lobe structure that is present in the first system 60. Furthermore, nulls 61 exhibited in the elevation pattern for the first system 60 represent vulnerabilities in the protection provided by such a repeater system. Thus, embodiments of the present subject matter may mitigate and/or eliminate nulling in the beam overlap region to reduce grating lobes in the respective signaling and may also reduce or minimize edge currents.

A response delivered to a threat from an embodiment of the present subject matter may be analogous to a monostatic RCS calculation. Thus, for every observation angle, each antenna in an exemplary receive assembly may see a complex response determined by its respective radiation pattern and physical location, the physical location of the threat, the power transmitted by the threat, and the antenna pattern of the threat's antenna. A response of a given antenna may then serve as the complex excitation for its paired antenna in the transmit enclosure. For example, in repeater-based jamming systems, power received by the jamming antenna system may be represented by the relationship below.

$$P_{JR} = \frac{P_T G_T \lambda^2 G_{JR}}{(4\pi R)^2 L_p} \qquad (1)$$

With reference to Equation (1), $P_T$ and $G_T$ represent power and gain, respectively, of an enemy radar system that will be jammed; $G_{JR}$ represents gain of the receive antenna system in the repeater; $L_p$ represents a loss term; $\lambda$ represents operational wavelength of the system; and R represents the physical separation between the jammer and the threat. It follows from Equation (1) that the power received by the enemy radar system may be represented as:

$$P_{RJ} = \frac{P_T G_T^2 G_{JR} G_{JT} G_e \lambda^4}{(4\pi R)^4 L_p^2} \qquad (2)$$

With reference to Equation (2), $G_{JT}$ represents gain of the transmit antenna system in the repeater, and $G_e$ represents amplifier gain of the repeater electronics. Overall repeater antenna gain of an exemplary antenna system employing a phase-conjugate configuration may then be determined using the relationship below.

$$F^{pol}(\theta_{Ob}{}^p, \varphi_{Ob}{}^p) = G_{JR}(\theta_{Ob}{}^p, \varphi_{Ob}{}^p) G_{JT}(\theta_{Ob}{}^p, \varphi_{Ob}{}^p) \qquad (3)$$

With reference to Equation (3), the superscript pol represents the polarization of a given component as overall gain is a complex-valued vector quantity, and the subscript p on the angular variables generally define the $p^{th}$ observation point. Re-radiated antenna gain may be determined using Equation (3) in place of the overall monostatic RCS as the monostatic RCS is generally dependent upon the EW system electronic gain defined in Equation (1).

Figure 7B:
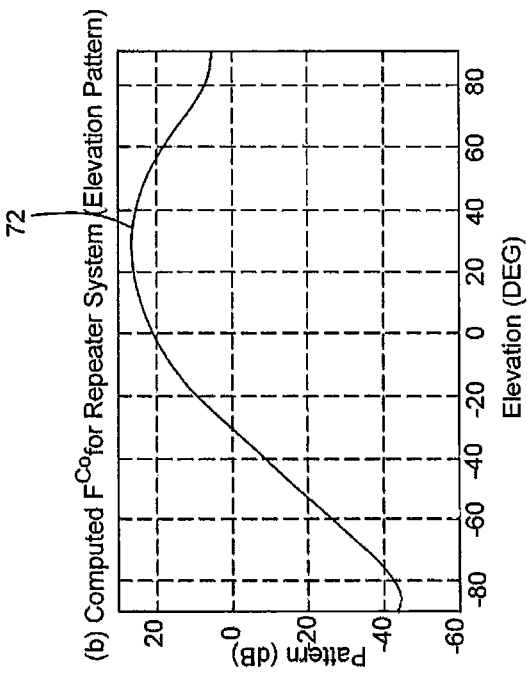
FIGS. 7A and 7B are graphical representations of azimuthal and elevational patterns for an embodiment of the present subject matter having eight corrugated horn antennas in each receive and transmit assembly.
Figure 7A:
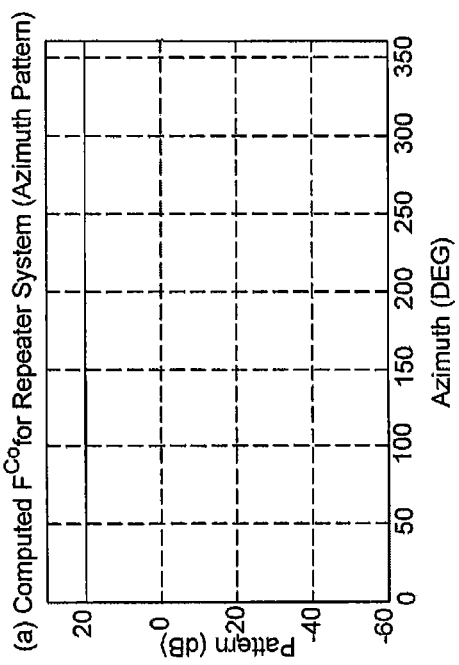
Figure 8:
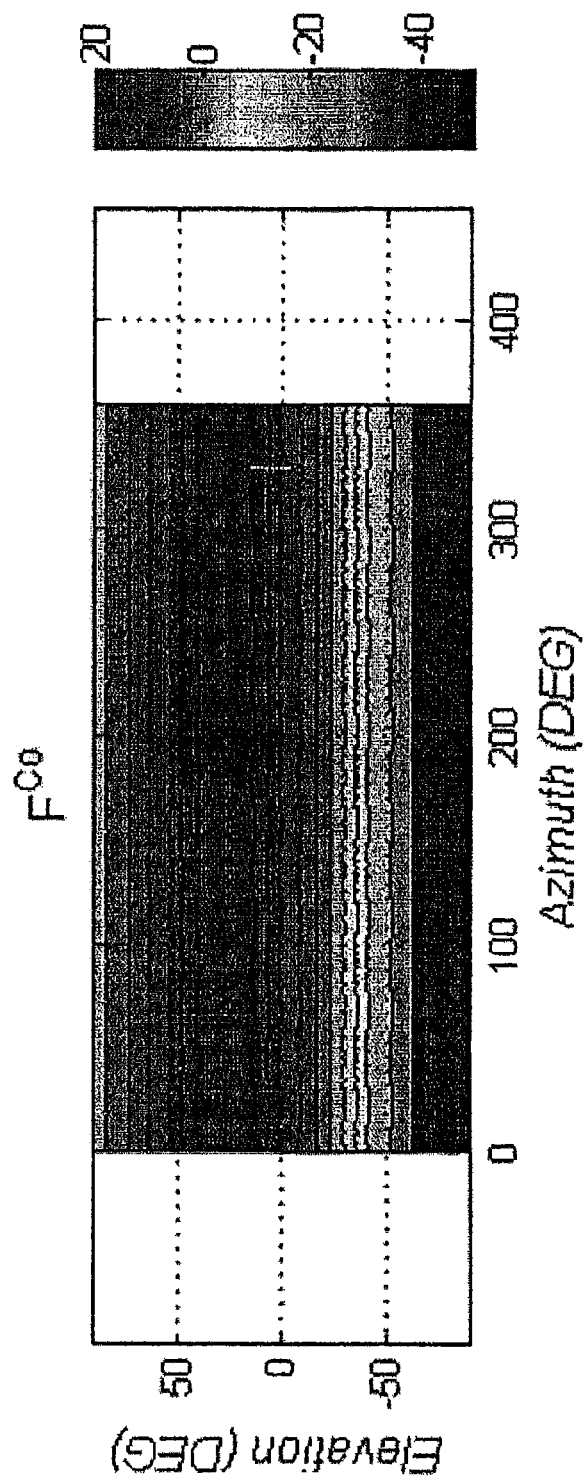
FIG. 8 is a graphical representation of a volumetric response of the antenna system of FIGS. 7A and 7B.

FIGS. 7A and 7B are graphical representations of azimuthal and elevational patterns for an embodiment of the present subject matter having eight corrugated horn antennas in each receive and transmit assembly. With reference to FIG. 7A and using Equation (3), azimuthal patterns may be graphically represented for a system having eight corrugated horn antennas in each receive and transmit assembly whereby the phase centers of the respective antennas lie along the vertical axis of the system with a non-limiting, 7.6 cm separation. In this embodiment, the respective antenna pointing angles are spaced at 45 degree increments. Further, each of the antennas in the receive and transmit assemblies are pointing to 25 degrees in elevation or altitude to maximize coverage above the horizon. Of course, antennas utilized in the receive and transmit assemblies may be designed for any elevational or altitudinal and azimuthal coverage of a given application and the provided example of 25 degrees and 45 degrees, respectively, should not so limit the scope of the claims appended herewith. The azimuth cut shown in FIG. 7A is taken at the horizon (0 degrees elevation) and indicates a grating lobe-free omnidirectional coverage. With reference to FIG. 7B, using Equation (3) altitudinal or elevational patterns may be determined for the same system and the elevation pattern illustrated in the figure provides a peak 72 at approximately 25 degrees in elevation as expected from the tilt in antenna pointing angle. The full volumetric pattern of the re-radiated antenna pattern ($F^{Co}$) is graphically represented in FIG. 8. With reference to FIG. 8, the volumetric response of the antenna system illustrated in FIGS. 7A-7B is plotted and provides a grating lobe-free pattern coverage over an entire sphere to a given threat engagement profile.

Figure 9:
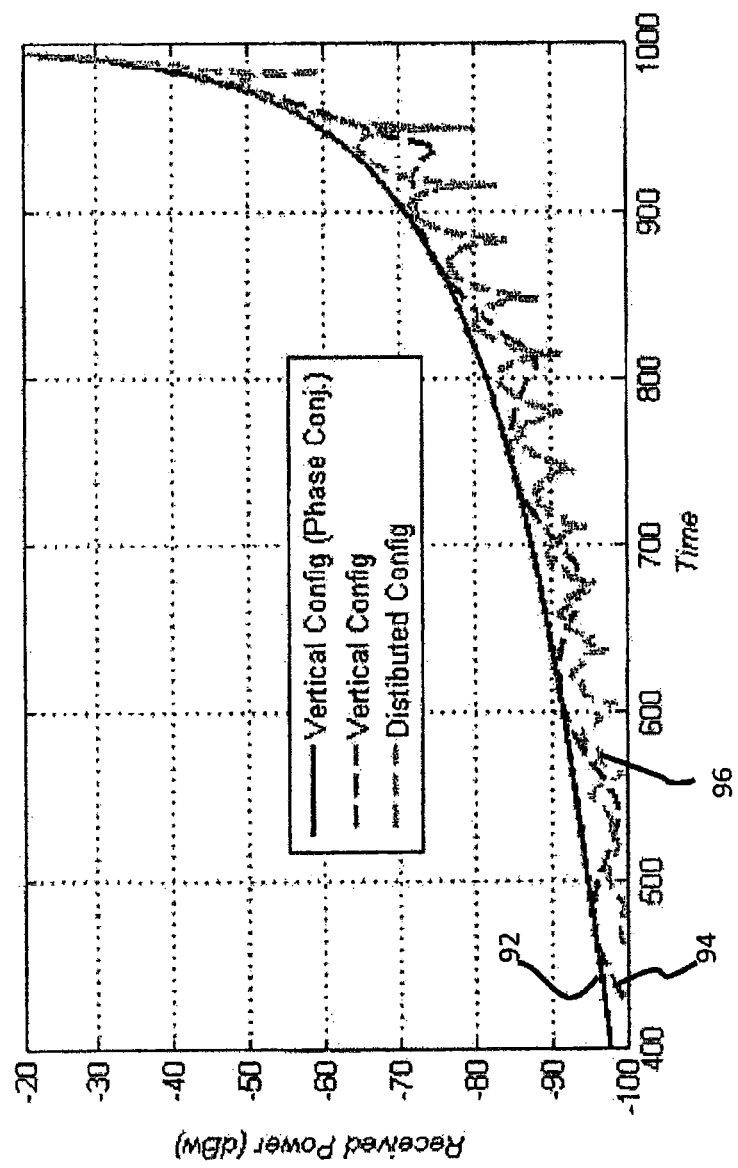
FIG. 9 is a graphical representation of power delivered to a threat traveling with a generic, linear motion profile is plotted as a function of time.

FIG. 9 is a graphical representation of power delivered to a threat traveling with a generic, linear motion profile plotted as a function of time. With reference to FIG. 9, received power delivered to such a threat was determined for an antenna system having a vertical configuration with phase-conjugate configuration 92, an antenna system having a vertical configuration without phase-conjugate configuration 94, and an antenna system having a distributed configuration 96 (e.g., separate antenna pairs distributed about an electrically large platform). As illustrated in FIG. 9, an embodiment of the present subject matter having a vertical configuration using a phase-conjugate configuration 92 may deliver a smooth response to the threat, while the other two configurations 94, 96 exhibit fluctuations in received power which represent blind spots in coverage.

Figure 10A:
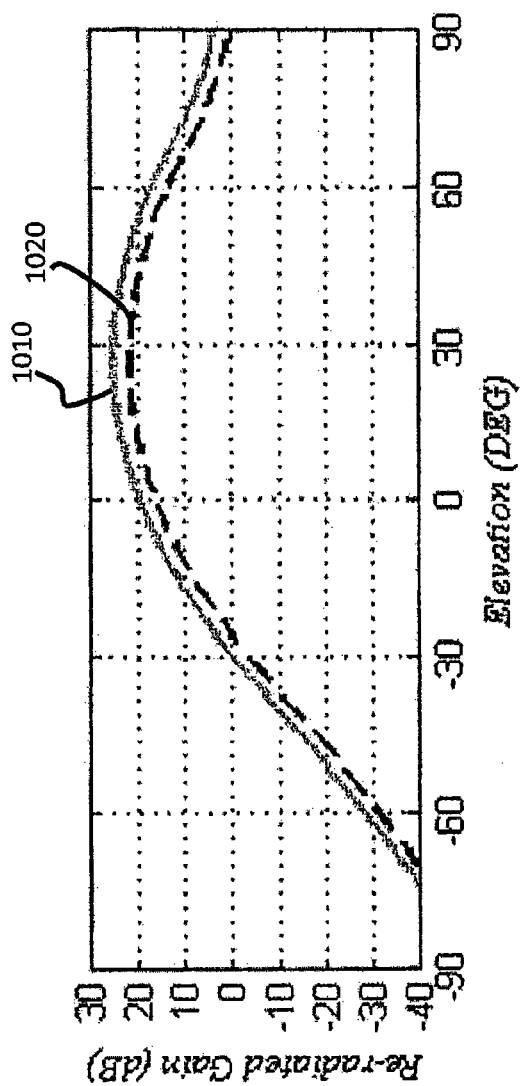
FIGS. 10A and 10B are graphical representations of azimuthal and elevational patterns for an embodiment of the present subject matter having a phase-conjugate configuration.
Figure 10B:
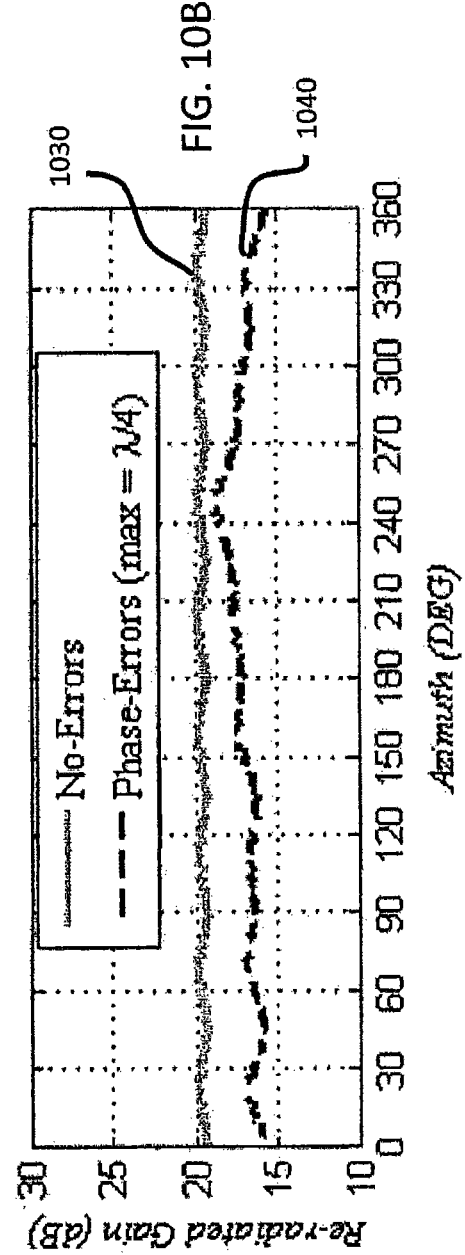

FIGS. 10A and 10B are graphical representations of azimuthal and elevational patterns for an embodiment of the present subject matter having a phase-conjugate configuration. With reference to FIG. 10A, an elevational or altitudinal pattern was determined for a phase-conjugate configuration whereby random errors are introduced in each of the respective eight channels with a maximum phase error of $\lambda/4$ and maximum amplitude uncertainty of 3 dB. The trace 1010 having no errors generally reflects the trace observed in FIG. 7B. The trace 1020 having errors illustrates that the introduced errors may result in a decreased overall gain and slight ripple in the pattern. With reference to FIG. 10B, an azimuthal pattern was determined for the phase-conjugate configuration with random errors introduced in each of the respective eight channels having a maximum phase error of $\lambda/4$ and maximum amplitude uncertainty of 3 dB. The trace 1030 having no errors generally reflects the trace observed in FIG. 7A. The trace 1040 having errors illustrates that the introduced errors may generally result in a decreased overall gain and slight ripple in the pattern. Typically, the pattern fluctuations seen in the two exemplary traces 1020, 1040 are acceptable and preferable to the grating-lobe structure present in conventional configurations (i.e., without the phase-conjugate configuration). It should also be noted that the errors introduced for these illustrations are more extreme than what may be typically anticipated in EW system design and were selected to indicate that channel imbalance is not a significant design concern for embodiments of the present subject matter.

One aspect of embodiments of the present subject matter may thus provide structural simplicity, higher power handling capabilities, and higher radiation efficiencies than conventional systems. For example, embodiments employing multiple high gain horn antennas in separate receive and transmit apertures with the pointing angles of the receive and transmit antennas rotated about the vertical axis of a respective enclosure or assembly and a pattern overlap at the half-power beamwidth of the antennas may provide a simpler structure, higher power handling capabilities, and higher radiation efficiencies than a phased array antenna system.

Another aspect of embodiments of the present subject matter may reduce the number of elements of conventional, comparable antenna systems. For example, phased array antennas generally include thousands of antenna elements, resulting in an increased number of transmit and/or receive modules, increased complexity, and increased cost. Embodiments of the present subject matter, however, provide a reduction in the number of receive and transmit elements (e.g., depending upon use, 2, 3, 4, . . . , 8, . . . , 16, etc.) thus presenting a significant reduction in complexity and/or cost in comparison to typical active phased array-based systems. Of course, the aforementioned number of exemplary antenna elements for embodiments of the present subject matter should not limit the scope of the claims appended herewith.

A further aspect of embodiments of the present subject matter is the lack of beam scanning. For example, exemplary antenna systems according to the present subject matter may provide continuous, omnidirectional coverage without the need for electrical beam scanning. Phased array systems, however, are subject to scan loss for beams scanned off of boresight which generally increases the overall system gain and power requirements to make sure thresholds are met at all angles. Thus, embodiments of the present subject matter may result in the reduction of phase-shifters and other active components to thereby mitigate potential quantization loss and other errors including beam-pointing errors.

One aspect of embodiments of the present subject matter is the lack of beam switching. For example, exemplary antenna systems may provide an omnidirectional monostatic RCS in the azimuthal plane which eliminates the need for beam switching. Further, embodiments of the present subject matter may handle multiple threats without the need for complex beam forming to support multiple beams.

An additional aspect of embodiments of the present subject matter is the design flexibility incurred by the concepts presented herein. For example, in phased array systems, the phased array elements must conform to half-wavelength spacing at the high frequency of the operational bandwidth. Such antenna spacing is not a critical factor in embodiments of the present subject matter as high gain antennas are employed which can be optimized for other system requirements including elevational beamwidth, polarization, bandwidth, isolation, etc. Further, embodiments of the present subject matter eliminate the need for direction finding (DF) which is present in conventional systems. For example, the omnidirectional monostatic RCS of embodiments of the present subject matter may eliminate the requirement for DF as incoming signals are re-radiated back towards their respective direction of origin, and knowledge of their location is thus unnecessary.

In various embodiments, for each pair of receive and transmit antenna elements, the receive and transmit antenna elements of that pair have substantially identical patterns except for phase shifts associated with phase-center placement. In order to reduce unwanted variation in the pattern, the only difference in the radiation pattern phase between antennas should result from the physical geometry/location of each antenna.

In various embodiments, for each pair of receive and transmit antenna elements, the receive and transmit antenna elements of that pair have low sidelobes to reduce coupling between the receive and transmit antenna elements. For a system containing N transmitting and N receiving antennas, each of the N pairs is intended to cover a 360/N degree-wide angular sector. Reducing the radiation into other sectors improves performance.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Certain embodiments or portions of the subject matter and the functional operations described in this specification can be implemented in digital electronic circuitry, or other hardware and/or software, including the structures disclosed in this specification and their structural equivalents, or in combinations of one or more of them. Thus, certain embodiments of the subject matter described in this specification can be implemented using one or more computer program products, i.e., one or more modules of computer program instructions encoded on a tangible program carrier for execution by, or to control the operation of, a data processing apparatus or other hardware. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the claimed subject matter, but rather as descriptions of features that may be specific to particular embodiments. For example, a large portion of the disclosure has described embodiments employed in EW repeater systems; however, it is contemplated that embodiments may find significant utility in a wide variety of industries such as, but not limited to, a radio beacon (e.g., airports, cell phones, etc.) or other embodiments requiring a beaconing response free of grating lobes. Additionally, embodiments of the present subject matter may operate with a wide frequency range, e.g., 8-12 GHz, 20-30 GHz, and/or lower or higher frequency ranges which may require larger or smaller hardware. Thus, embodiments may appropriately scale across the microwave, millimeter, etc. spectrum and may also provide varying bandwidths (e.g., a few GHz bandwidth, 20% of center frequency, etc.). Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As shown by the various configurations and embodiments illustrated in FIGS. 1A-10B, a method and system for phase-conjugate configurations of high-gain, dual-polarized sector antennas for a repeater have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

The invention claimed is:

1. A phase-conjugate antenna system comprising:
a first set of N receive antenna elements pointing in azimuthal directions and configured to receive first signals, each receive antenna element having a phase center located substantially on an axis; and
a second set of N transmit antenna elements configured to transmit second signals, each transmit antenna element having a phase center located substantially on the axis,
wherein each transmit antenna element is paired with one of the receive antenna elements,
wherein the receive and transmit antenna elements of each pair point in the same azimuthal direction,
wherein for each pair of receive and transmit antenna elements, a midpoint between the phase centers of those receive and transmit antenna elements is located substantially along the axis, and
wherein the midpoints between the phase centers of the receive and transmit antenna elements of the pairs of receive and transmit antenna elements are substantially coincident.

2. The phase-conjugate antenna system of claim 1, further comprising an enclosure defining the axis.

3. The phase-conjugate antenna system of claim 2, wherein the receive and transmit antenna elements are within the enclosure.

4. The phase-conjugate antenna system of claim 3, wherein the midpoints between the phase centers of the receive and transmit antenna elements of the pairs of receive and transmit antenna elements and a midpoint of the axis are substantially coincident.

5. The phase-conjugate antenna system of claim 1, wherein at least two pairs of receive and transmit antenna elements point in different azimuthal directions.

6. The phase-conjugate antenna system of claim 5, wherein the pairs of receive and transmit antenna elements point in different azimuthal directions.

7. The phase-conjugate antenna system of claim 1, wherein none of the receive antenna elements are altitudinally aligned with any of the other receive antenna elements and none of the transmit antenna elements are altitudinally aligned with any of the other transmit antenna elements.

8. The phase-conjugate antenna system of claim 1, wherein at least one of the receive and transmit antenna elements is a horn antenna.

9. The phase-conjugate antenna system of claim 1, wherein for each pair of receive and transmit antenna elements, the receive and transmit antenna elements of that pair have substantially identical patterns except for phase shifts associated with phase-center placement.

10. The phase-conjugate antenna system of claim 1, wherein for each pair of receive and transmit antenna elements, the receive and transmit antenna elements of that pair have low sidelobes to reduce coupling between the receive and transmit antenna elements.

11. A phase-conjugate antenna system comprising:
an enclosure defining an axis having a midpoint;
multiple receive antenna elements pointing in azimuthal directions and configured to receive first signals, each receive antenna element having a phase center that is located substantially on the axis and that is altitudinally spaced apart from the midpoint; and
multiple transmit antenna elements configured to transmit second signals, each transmit antenna element having a phase center that is located substantially on the axis and that is altitudinally spaced apart from the midpoint,
wherein each transmit antenna element is paired with one of the receive antenna elements,
wherein the receive and transmit antenna elements of each pair point in the same azimuthal direction, and wherein for each pair of receive and transmit antenna elements, those receive and transmit antenna elements are altitudinally spaced substantially the same distance from the midpoint.

12. The phase-conjugate antenna system of claim 11, wherein the receive and transmit antenna elements are within the enclosure.

13. The phase-conjugate antenna system of claim 11, wherein for each pair of receive and transmit antenna elements, a midpoint between the phase centers of those receive and transmit antenna elements is located substantially along the axis.

14. The phase-conjugate antenna system of claim 13, wherein the midpoints between the phase centers of the receive and transmit antenna elements of the pairs of receive and transmit antenna elements and the midpoint of the axis are substantially coincident.

15. The phase-conjugate antenna system of claim 11, wherein at least two pairs of receive and transmit antenna elements point in different azimuthal directions.

16. The phase-conjugate antenna system of claim 15, wherein the pairs of receive and transmit antenna elements point in different azimuthal directions.

17. The phase-conjugate antenna system of claim 11, wherein none of the receive antenna elements are altitudinally aligned with any of the other receive antenna elements and none of the transmit antenna elements are altitudinally aligned with any of the other transmit antenna elements.

18. The phase-conjugate antenna system of claim 11, wherein at least one of the receive and transmit antenna elements is a horn antenna.

19. The phase-conjugate antenna system of claim 11, wherein for each pair of receive and transmit antenna elements, the receive and transmit antenna elements of that pair have substantially identical patterns except for phase shifts associated with phase-center placement.

20. The phase-conjugate antenna system of claim 11, wherein for each pair of receive and transmit antenna elements, the receive and transmit antenna elements of that pair have low sidelobes to reduce coupling between the receive and transmit antenna elements.

* * * * *